Nov. 23, 1971    M. DWORSKI    3,621,600

FISH LURE

Filed June 20, 1969    2 Sheets-Sheet 1

INVENTOR.
MICHAEL DWORSKI.
BY
ATTORNEY

Nov. 23, 1971 — M. DWORSKI — 3,621,600
FISH LURE
Filed June 20, 1969 — 2 Sheets-Sheet 2

INVENTOR.
MICHAEL DWORSKI
BY
ATTORNEY

United States Patent Office 3,621,600
Patented Nov. 23, 1971

3,621,600
FISH LURE
Michael Dworski, 468 French Road,
Rochester, N.Y. 14618
Filed June 20, 1969, Ser. No. 834,979
Int. Cl. A01k 85/00
U.S. Cl. 43—17.6
7 Claims

ABSTRACT OF THE DISCLOSURE

A fish lure having a series of annular or peripheral fins with peripheral V grooves. The lure has a separate translucent head and body members assembled to the head either in the form of a series of disks or like halves which can be assembled around an incandescent lamp and drycell which weight the lure. The fins may be oval and have turbulence—creating apertures, or may be of dished shape.

---

This invention relates to fish lures and more particularly to artificial minnows.

More particularly, the invention has to do with a minnow construction of a shape to generally simulate a small minnow, the body portion of which comprises a plurality of peripheral ribs adapted to the production of eddy currents. Additionally, the invention comprises a construction which may be assembled from a plurality of molded disk-like parts, or composed of like halves assembled on a longitudinal plane. Further provision is made for the inclusion of illumination, clear or translucent plastic being employed to transmit the light from an incandescent lamp energized by a dry cell disposed within the lure.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings wherein like reference characters indicate like parts:

Figure 1:
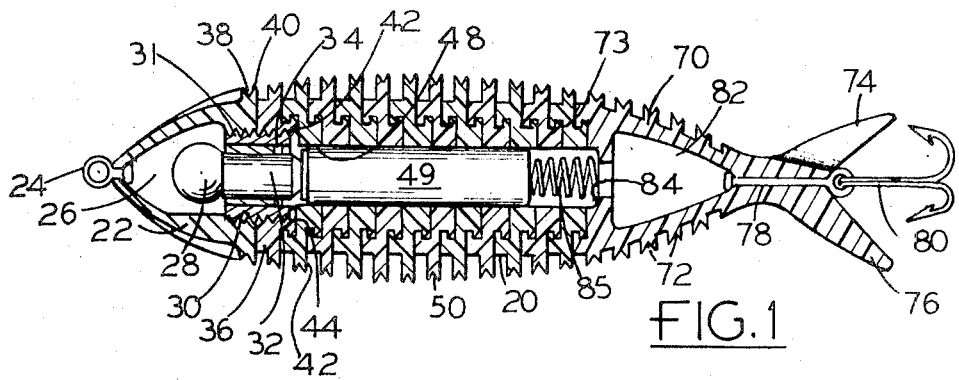
FIG. 1 is a longitudinal section of a lure, the body portion of which consists of a plurality of assembled disks.

Referring to FIG. 1, there is shown an artificial minnow 20 composed of a plurality of parts manually assembled. There is provided a head portion 22 of transparent or translucent plastic, having a swivel eye 24 for attachment to a fish line, a cavity 26 for a miniature incandescent lamp 28, and internal threads 30 for receiving an externally-threaded sleeve 31 having receptacle means for receiving and holding the lamp base 32 in place, as by a bayonet connection 34. Threaded on the sleeve and locked against the head portion 22 is an annular disk-like member 36. The disk member has an external annular rib 38 with an annular V notch 40, and an annular boss 42 having an integral saw-tooth flange 44 and annular groove 46. The member 36 has a bore 48 through which a penlight dry cell 49 extends.

Rearwardly of the member 36 is a series of annular disk-like members 50 each having an annular rib 52, of like diameter or varying diameter or of oval shape, with an annular V notch 54. Each member 50 on one side is provided with an annular internal groove 56 and on the other side an annular boss 42 having an integral saw-tooth flange 44 and annular groove 46, the bosses 42 on member 36 and members 50 being alike. By reason of the resiliency of the plastic, the annular member 36 and each of the series of annular members 50 may be manually forced together or apart by forcing the sawtooth flange 44 into or out of the annular groove 56 of the adjacent member, the successive saw-tooth flanges of the remaining members being similarly received in the annular internal grooves 56 of the adjoining members, the resistance to separating the members being greater to protect against disassembly upon the strain incident to a strike. The members may be of varying colors and selected by the individual from an assortment to construct a minnow with varying peripheral stripes or colors as desired for the purpose of attracting a catch.

To the rear-most disk 50 is attached a tail piece 70 having an annular internal groove 73 to receive the sawtooth flange 44 of the rear-most disk 50, for firm attachment thereto. The tail piece may have a plurality of annular ribs 72, and a tail having flat wings 74 and 76, which may be suitably twisted to act propeller-like to cause the lure to rotate as it is drawn through the water. In the tail piece is an eye 78 to which is attached a three-prong hook 80. The tail piece is made hollow as at 82 so as to control its weight, and is provided with an annular seat 84 for a compression spring 85 that bears against and connects electrically with the dry cell, and urges the same into contact with the end tip of the lamp 28. Any suitable conduction means as a thin metal strap (not shown) may be provided to complete a connection from the coil spring to the lamp base to complete the electrical connection necessary.

It will be seen that the length of the minnow may be extended to receive two cells if desired or a single cell with a longer spring. The coil spring being in compression provides a rigidity between the snap connections between the successive disks so that any slack or looseness is taken up.

Figure 2:
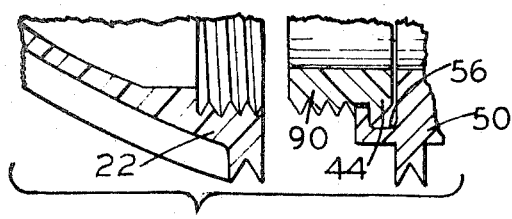
FIG. 2 is an enlarged fragmentary sectional view showing a head end attachment modification.
Figure 3:
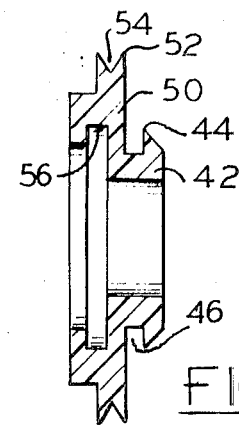
FIG. 3 is an enlarged sectional view of a disk.

In FIG. 2, there is shown a modified head connection construction wherein the sleeve 90 is provided with a boss-like extension and an annular saw-tooth flange 44 so dimensioned as to be received in the internal annular groove 56 of the succeeding member 50, whereby the special member 36 may be eliminated.

Figure 4:
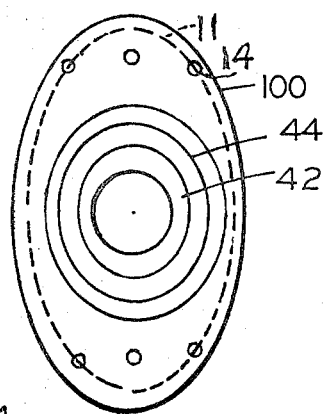
FIG. 4 is a plan view of a modified oval-shaped disk.

In FIG. 4, there is shown a modified member wherein the rib 100 is of oval shape. If a succession of members as shown in FIG. 4 are employed, the major axes of the oval ribs may be arranged at different angles with respect to each other and if desired each successive disk may be set at a certain angle to the adjoining disk to provide an overall helical shape, which would also be effective to cause rotation as drawn through the water.

Figure 5:
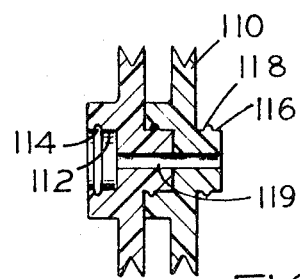
FIG. 5 is a sectional view of a modified disk and annular groove and rib connection.

In FIG. 5, there is shown a modified construction wherein each disk 110 has an annular recess 112 with an internal groove 114, which will nicely fit over and snap over a boss 116 having an external complementary rib 118. Such disks may have a central aperture 119 through which the fish line may extend, and assuming the tail and head have similar apertures, as by eliminating the eyes 24 and 78, the hook may be secured to the fish line, and the fish line threaded through the disks whereby to act as protection against the parts becoming disconnected, as by a strike, since the threaded elements cannot be lost, or subjected to the strain of a strike, due to the fish line extending therethrough to the hook.

Figure 6:
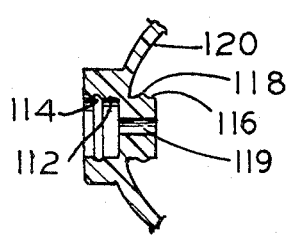
FIG. 6 is a sectional view of a modified concavo-convex disk.

In FIG. 6, a modified disk is shown wherein the rib 120 may be of a disked shape. By choosing a diameter for the aperture 119 sufficiently large, a lamp and battery may be accommodated, as in FIG. 1.

Figure 7:
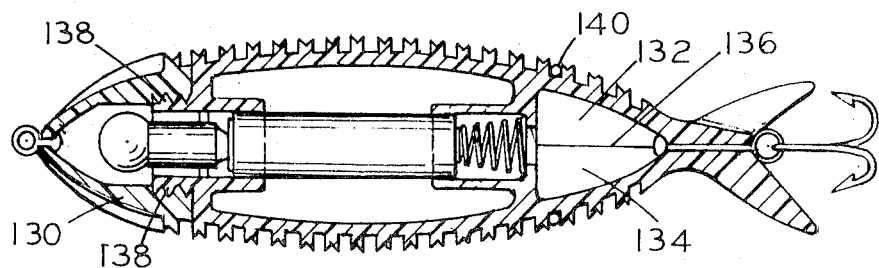
FIG. 7 is a sectional view of a lure having substantially like body sections separating on a longitudinal plane.
Figure 8:
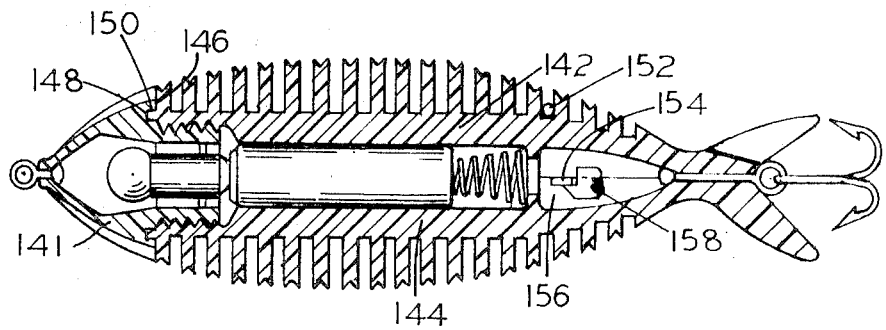
FIG. 8 is a sectional view of a modification of FIG. 7.

In FIGS. 7 and 8, a minnow having an external appearance similar to that of FIG. 1 is provided, without employing a series of manually-assembled disks. Such a minnow may have the same head portion 130, and the body portion may be split in two sections 132 and 134 along the line 136. The forward ends of the two sections are held together by the head portion 130 being threaded over the externally-threaded halves 138 of the sections 132 and 134. The rear ends of the sections may be held together by a spring ring 140 laid in one of the grooves between the ribs, as shown.

In the modification of FIG. 8, the head 141 is provided with external threads to receive the shell members 142 and 144. To lock the members together at the forward end, the end face 146 of the head may have an annular recess 148 to receive arcuate extension 150 of the body members, so that an interlock of the three parts is effected when the head 140 is screwed in place. In a similar manner, a split spring ring 152 may be employed to hold the tail ends of the sections together. If desired, the members may be held together at the tail end solely by providing lugs 154 on one of the members in the cavity 156, which may engage beneath a tongue 158 integral with the other members, so that the members 142 and 144, before being assembled to the head, can be secured at the tail by sliding one member relative to the other to position the tongues 158 under the lugs 154 after which, upon attachment of the head, all parts are locked together. A lug and a tongue may be formed on each section so that each section is alike except for the internal threads that receive the head.

Figure 9:
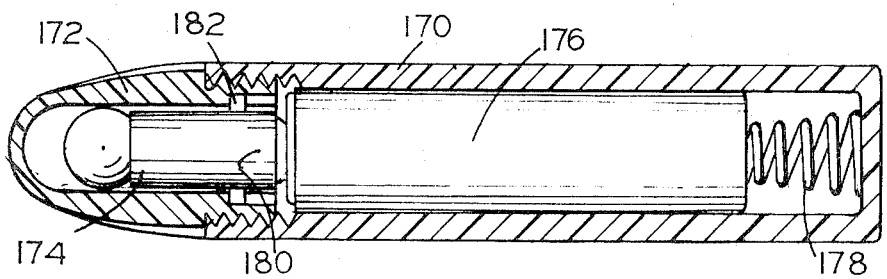
FIG. 9 is a waterproof light and cell unit which may be used in place of the assembly shown in FIGS. 1, 7 and 8.

It will be apparent that the illumination feature may be dispensed with, and suitable weights may be placed in the hollow provided for the cell. The weight may take the form of a unitary lamp and battery assembly as shown in FIG. 9 which may be made watertight. In FIG. 9, there is shown a case 170, transparent or translucent head 172 threaded thereon, and having a lamp base 174 positioned therein. A small battery 176 is urged by a spring 178 into contact with the lamp, and a suitable ribbon conductor (not shown) extending from beneath the spring and along the side of the cell and into contact with the lamp shell 180 below the ears 182, may complete the circuit. The circuit may be broken by disassembly, or partial disassembly to eliminate spring pressure and break the contact. Such a unit may be of a suitable weight as desired to provide a suitable overall weight of the lure.

It will be seen that the peripheral grooves 54 and 11 (FIG. 4) and grooves shown in the fins of FIGS. 1, 5, 7 and 8 effect water breaks or turbulence as the lure is drawn through the water which attract fish. Such turbulence may be enhanced by providing oval or round apertures 14 as indicated in FIG. 4.

While an embodiment and variations of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A fish lure in the form of an artificial minnow comprising a head member and body members, each body member having at least one peripheral fin, and manually engageable means for detachably holding the members in assembled relation, the body members comprising a series of disks with said fins formed as annular flanges, and in which each disk has complementary attachment means on opposite sides thereof for resilient locking engagement with adjacent disks.

2. A fish lure as set forth in claim 1 wherein a tail member is provided with an attachment means complemental to one of the attachment means of an adjacent disk, whereby to resiliently lock the tail piece to an adjacent disk.

3. A fish lure as set forth in claim 1 wherein the body members form a portion provided with a hollow central aperture in which is disposed a battery, and the head member is translucent and provided with an incandescent lamp.

4. A fish lure as set forth in claim 2 wherein the tail member has wings with pitch to effect rotation of the lure when drawn through the water.

5. A fish lure as set forth in claim 1 wherein the fins have peripheral V grooves to create water turbulence.

6. A fish lure as set forth in claim 1 wherein at least some of the disks are of oval shape, and have apertures in the long axis and areas.

7. A fish lure in the form of an artificial minnow comprising a head member and body members, said body members having a plurality of peripheral fins, and manually engageable means for detachably holding the members in assembled relation, at least one of said fins having a peripheral V groove to create water turbulence.

References Cited

UNITED STATES PATENTS

| | | | |
|---|---|---|---|
| 1,359,618 | 11/1920 | Oliver et al. | 43—42.34 X |
| 2,568,488 | 9/1951 | Cummins | 43—42.09 |
| 2,754,610 | 7/1956 | Carlson | 43—17.6 |

SAMUEL KOREN, Primary Examiner

D. J. LEACH, Assistant Examiner

U.S. Cl. X.R.

43—42.06, 42.09, 42.34, 42.39